(12) United States Patent
Agraharam et al.

(10) Patent No.: US 6,412,011 B1
(45) Date of Patent: Jun. 25, 2002

(54) METHOD AND APPARATUS TO ENHANCE A MULTICAST INFORMATION STREAM IN A COMMUNICATION NETWORK

(75) Inventors: Sanjay Agraharam, Marlboro; Robert Edward Markowitz, Glen Rock; Kenneth H. Rosen, Middletown; David Hilton Shur, Aberdeen; Joel A. Winthrop, Little Silver, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/152,404

(22) Filed: Sep. 14, 1998

(51) Int. Cl.$^7$ ............................................... G06F 15/16
(52) U.S. Cl. ...................................... 709/231; 709/246
(58) Field of Search ................................. 709/231, 224, 709/225, 236, 246; 370/432, 236

(56) References Cited

U.S. PATENT DOCUMENTS

| | | | | |
|---|---|---|---|---|
| 5,005,127 A | * | 4/1991 | Kugimiya et al. | 364/419 |
| 5,485,526 A | * | 1/1996 | Tobin | 382/232 |
| 5,596,754 A | * | 1/1997 | Lomet | 709/229 |
| 5,652,759 A | * | 7/1997 | Stringfellow, Jr. | 370/522 |
| 5,675,507 A | * | 10/1997 | Bobo, II | 364/514 R |
| 5,717,913 A | * | 2/1998 | Driscoll | 395/605 |
| 5,758,194 A | * | 5/1998 | Kuzma | 395/231 |
| 5,761,601 A | * | 6/1998 | Nemirofsky et al. | 725/1 |
| 5,818,441 A | * | 10/1998 | Throckmorton et al. | 345/328 |
| 5,841,872 A | * | 11/1998 | Colvin, Sr. | 380/28 |
| 5,864,827 A | * | 1/1999 | Wilson | 705/35 |
| 5,929,846 A | * | 7/1999 | Kikinis | 345/327 |
| 5,943,648 A | * | 8/1999 | Tel | 704/260 |
| 5,978,381 A | * | 11/1999 | Perlman et al. | 370/432 |
| 5,983,182 A | * | 11/1999 | Moore | 704/270 |
| 5,991,298 A | * | 11/1999 | Hunt et al. | 370/390 |
| 6,029,045 A | * | 2/2000 | Picco et al. | 455/5.1 |
| 6,044,401 A | * | 3/2000 | Harvey | 709/225 |
| 6,047,296 A | * | 4/2000 | Wilmott et al. | 707/513 |
| 6,185,560 B1 | * | 2/2001 | Young et al. | 707/6 |
| 6,195,641 B1 | * | 2/2001 | Loring et al. | 704/275 |

OTHER PUBLICATIONS

David et al., A unified data model for representing multimedia, timeline, and simulation data, IEEE transactions on knowledge and data engineering, vol. 10, No. 5, pp. 746–767 (22), 12/1995.*
Bradley, "Conquering Information Overload", Dec. 08, 1995, LAN Times, c12, n26, p38 (1).*
Parnes et al., mTunnel a multicast tunneling system with a user–based quality–of–service model, 1997, Springer–Verlag, pp. 87–96.*
Speech recognition translation happening online, Oct. 1, 1999, v4, n10, p. 6 (1).*
"speech systems Announces Clint/Server software for speech recognition SpeechNet enables Low–cost, Dictributed Speech Application", Gale Group Promt, 04353861, 2 pages.*
Brown, "Searchable Television", May 22, 1998, Broadcasting&Cable, v128, n22, p30.*
Product Technology: TELEtranslator Product, TCC Communications Corporation (Oct. 23, 1997). pp. 1–2.

* cited by examiner

Primary Examiner—Robert B. Harrell
Assistant Examiner—Bunjob Jaroenchonwanit
(74) Attorney, Agent, or Firm—Kenyon & Kenyon

(57) ABSTRACT

A method and apparatus that enhances a multicast information stream, such as an IP multicast session, in a communication network is provided. The stream is received through the communication network and is enhanced at substantially the time the first stream is received. The information stream may be enhanced by adding transcribed content, such as content generated by speech recognition software, or translated content, such as from a first language to a second language, to the stream. The information stream may also be enhanced by adding content to the first information stream, such as content related to the original content. The enhanced stream may be sent to a user as a second multicast information stream. The enhanced stream may be received by the user in place of, or along with, the original information stream. The enhanced content may be sent to the user at the conclusion of the information stream, if desired.

11 Claims, 7 Drawing Sheets

METHOD AND APPARATUS TO ENHANCE A MULTICAST INFORMATION STREAM IN A COMMUNICATION NETWORK

FIELD OF THE INVENTION

The present invention relates to multicast sessions in a communication network. More particularly, the present invention relates to a method and apparatus that enhances a multicast information stream in a communication network.

BACKGROUND OF THE INVENTION

Many different types of information can be sent through a communication network such as the Internet. Such information includes, for example, streams of text (including software). images (including still and moving, images) and audio information. Streams that combine different types of information, such as multimedia presentations, may be transmitted as well.

A communication network user can request an information stream directly from an information source, or "sender," which responds to the request by sending the stream to the user. This method of sending an information stream from a single point, such as the sender, to a single point, such as the user, is called a "unicast" transmission. The sender may also "broadcast" the information stream through the communication network. A broadcast transmission is sent to routers in the communication network—even if no user downstream from a particular router is going to receive the stream.

Both unicast and broadcast transmissions, however, can be very inefficient. With a unicast transmission scheme if the sender wishes to send information to a number of receivers, the sender must transmit a number of, separate streams of information into the network, even though each stream contains exactly the same information. Moreover, each stream must be individually handled by communication nodes, or routers, in the network. Such an approach can result in an unacceptable amount of traffic in the network. A broadcast transmission can be inefficient because some routers may be tied up handling information streams even if no user downstream from a particular router receives the information, which is also inefficient.

As an alternative to a unicast or broadcast transmission, the information stream can be sent from a single point to multiple points. This method of sending information, called a "multicast" transmission, is illustrated in FIG. 1, which shows a block diagram of a known system for transmitting a multicast information stream in a communication network 200. The communication network 200 has a number of multicast capable routers 210, and the information enters the network as a single stream 202 from a source 220 to a dividing router. As the stream travels through the network, multicast capable routers divide the stream 204, 206 and send the information to downstream multicast routers and/or to locally attached interested computers 100, 230. Any user who wants to receive a particular multicast transmission, or "session," may, for example, send a "join" message to a local multicast capable router 210.

A user interested receiving a multicast transmission may wish to receive an enhanced version of the information stream, such as a version that has a real-time transcription added to the original stream. For example, a user interested in a multicast transmission containing speech may instead want to receive an information stream that has a text version of the speech added to the stream. Such a situation could arise, for example, if the user is not able to hear the audio information because of a disability or a lack of necessary hardware.

A user interested in an information stream may also want to receive a version of the stream that has translated information added to the original stream. For example, a user interested in an information stream with English content may instead wish to receive a stream that has a Japanese version of the content, either in place of or in addition to the English version. Some users may want to have content in an information stream both transcribed and translated.

A user interested in an information stream may also want to receive a version of the stream that has additional content, related to the content in the original stream. For example, a user interested in a multicast transmission containing speech may instead want to receive an information stream that has videos and still images, related to the topics begin, discussed, in addition to the original stream.

The sender of a multicast transmission, however, may not know which users are receiving the stream, and therefore will not know what types of enhancements should be performed. The sender can provide the most common enhancements, such as when closed captioning information is added to a television broadcast. This effort and expense may be unnecessary if no users receiving the stream want the enhancements. Moreover, the service may still not satisfy users with less common needs.

Another wavy that an information stream could be enhanced is to have a user receive the original information stream, in which case the user's computer can perform an automated enhancement process. For example, it is known that a device can translate closed caption information into a different language. There are a number of problems, however, with this method of enhancing multicast information streams. For example, the user's computer may not have the hardware or software capabilities to perform the enhancement. This may be especially true if the user wishes to have the content enhanced at substantially the time the stream is received. Moreover, if the content is to he enhanced by, for example, adding video and still images related to the topic being discussed, it is not realistic to expect that every user's PC could store a meaningful library of video and images related to a wide variety of topics.

Instead of receiving, an enhanced information stream in place of the original information stream, a user many want to receive both the original stream and supplemental information, such as supplemental information that contains a converted version of content in the original stream. For example, a user receiving a multicast transmission containing speech may also want to receive a text version of the speech along with the original stream. Similarly, some users may wish to receive translated versions of the multicast transmission along with the original information stream.

In view of the foregoing, it can be appreciated that a substantial need exists for a method and apparatus that enhances an information stream in the communication network and solves the problems discussed above.

SUMMARY OF THE INVENTION

The disadvantages of the art are alleviated to a great extent by a method and apparatus that enhances a multicast information stream in a communication network. A first multicast information stream is received through the communication network, and the first information stream is enhanced at substantially the time the first stream is received. The first information stream may be enhanced by adding transcribed content, such as content generated by speech recognition software, or translated content, such as from a first language to a second language, to the stream.

The first information stream may also be enhanced by adding content to the first information stream, such as content is related to the original content. The enhanced stream is sent to a user, through the communication network, as a second multicast information stream. A number of information streams may be enhanced and sent to a number of users.

Another embodiment of the present invention provides a method and apparatus for converting an information stream received through a communication network, such as a first Internet protocol multicast transmission stream. Content in the information stream is converted at substantially the time the stream is received, such as by transcribing the content using speech recognition software and/or by translating the content from a first language to a second language. The converted content is sent to a user, such as by sending the converted content to one or more users, as it is converted, in the form of a second Internet protocol multicast transmission stream. The converted content may be sent to the user at the conclusion of the information stream, if desired.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
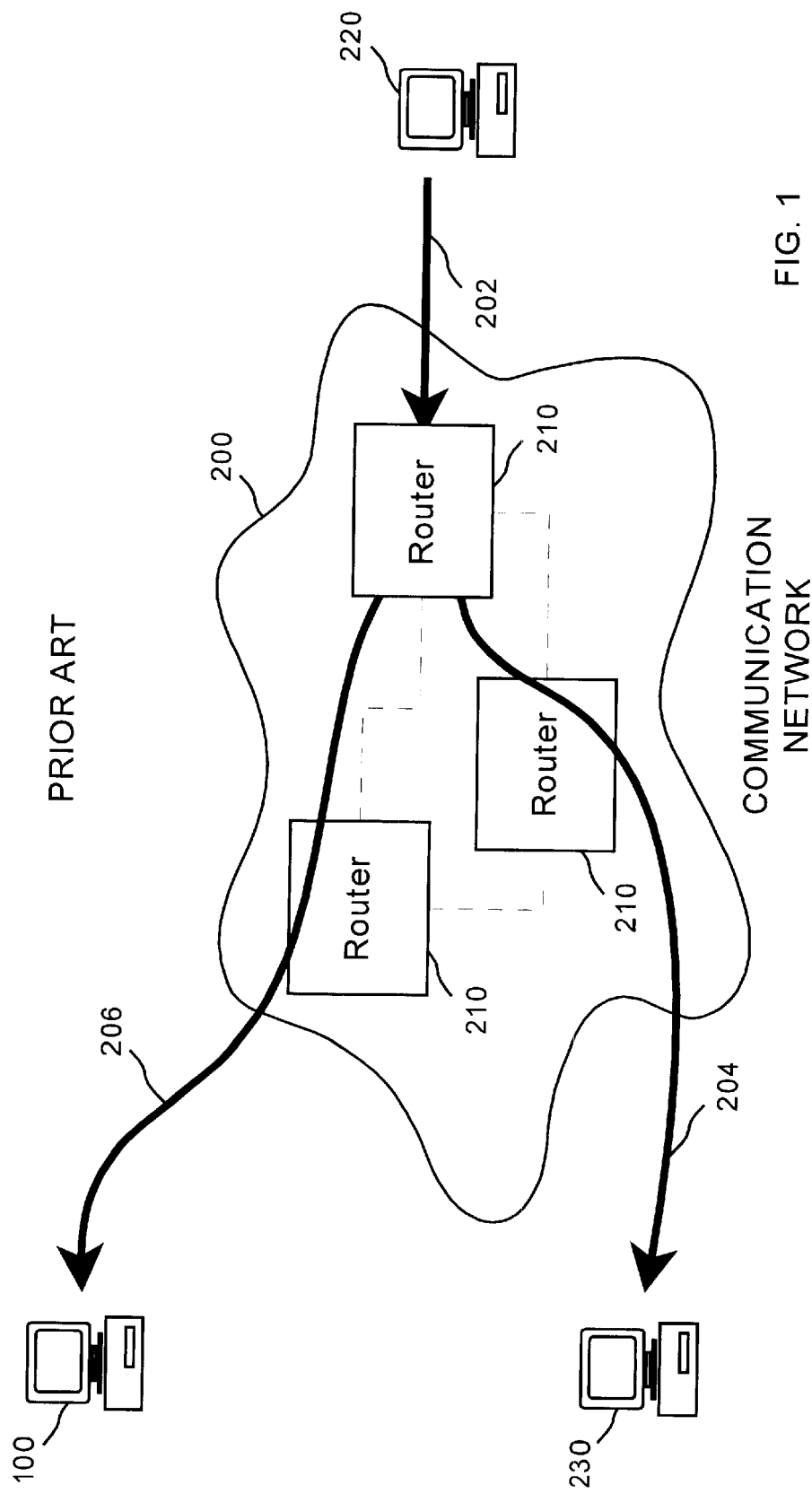
FIG. 1 is a block diagram of a known system that transmits a multicast information stream in a communication network.
Figure 2:
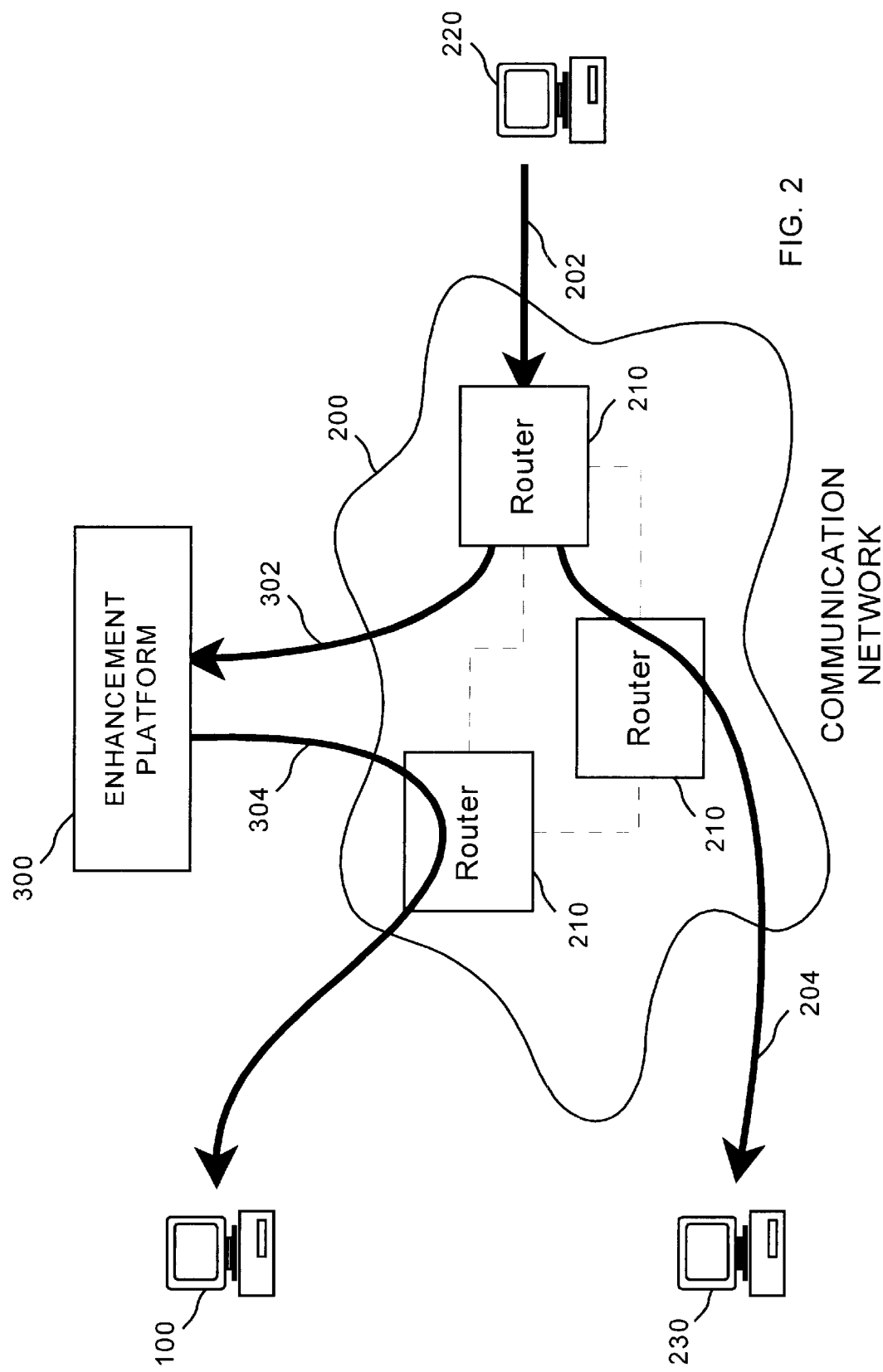
FIG. 2 is a block diagram including a system that enhances a multicast information stream in a communication network according to an embodiment of the present invention.

The present invention is directed to a method and apparatus that enhances a multicast information stream in a communication network. Referring now in detail to the drawings wherein like parts are designated by like reference numerals throughout, there is illustrated in FIG. 2 a block diagram including a system that enhances a multicast information stream in a communication network according to an embodiment of the present invention. The system includes a enhancement platform 300 coupled to a communication network 200, such as the Internet. The communication network 200 comprises a number of inter-connected, multicast capable routers 210 that let a sender 220 transmit a multicast information stream to a receiver 230.

According to an embodiment of the present invention, the enhancement platform 300 receives a multicast information stream through the communication network 200 and enhances content in the stream at substantially the time the stream is received.

As used herein, an "enhanced" information stream may be sent to a user in place of the original information stream and may include, for example, both the original content and content that has been transcribed from one from to another. In one example of transcription, audio information containing speech can be transcribed into a text representation of the speech. This may be done, for example, using speech recognition software. Other types of transcription are also possible. For example, music may be transcribed into musical notes, or text information may be transcribed into spoken words with the use of a speech synthesizer. Either spoken words or text could also, for example, be transcribed into graphics, such as sign language.

The term "enhanced" also includes, for example, translated content, such as from a first language to a second language. Content could also be translated from one format, such as one computer format, to another format. The term "enhanced" also includes, for example, content that relates to the original information stream. For example, related videos, charts and still images may be added to the original information.

Note that an original information stream may include a number of different types of content, such as text, audio and image content. According to an embodiment of the present invention, one or more of the types of content may be deleted, enhanced or added by the enhancement platform 300.

The enhanced content may be sent to a user's Personal Computer (PC) 100. In one example implementation, the platform sends the enhanced content to one or more user PCs, as the stream is enhanced, in the form of a second multicast transmission stream to be received by the users in place of the original information stream. In this way, a user can receive an enhanced version of a multicast transmission at substantially the same time as the original version is transmitted.

Note that the enhancement platform 300 may service a large number of users, such as a large number of users who have subscribed to various enhancement services. This may be done, for example, by providing several different enhanced multicast streams to different groups of subscribers, such as a French speaking group and a Japanese speaking group. The enhancement platform 300 may also receive and enhance a large number of multicast information streams from the communication network 200. The enhancement platform 300 may perform this service independently and remotely from the users and from the parties supplying multicast information streams. According to another embodiment of the present invention, the enhancement platform 300 may instead be associated with a party supplying a multicast information stream.

Figure 3:
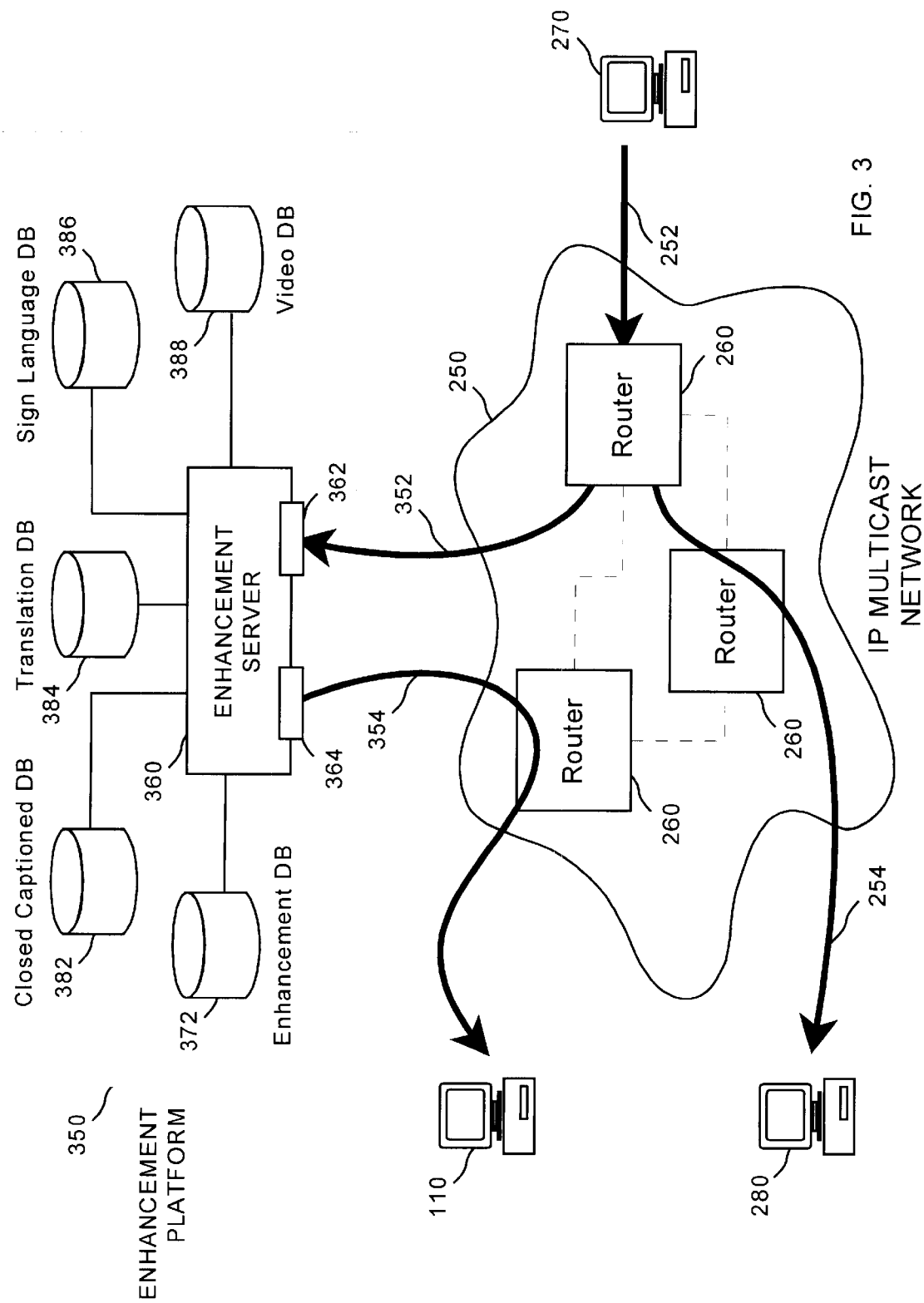
FIG. 3 is a more detailed block diagram of a system that enhances a multicast information stream according to an embodiment of the present invention.

FIG. 3 is a more detailed block diagram of a system that enhances a multicast information stream according to an embodiment of the present invention. The system includes an enhancement platform 350. The enhancement platform 350 contains an enhancement server 360 that is connected to an Internet protocol (IP) multicast network 250 through a communication port 362 (e.g., an Ethernet port). The IP multicast network 250 is comprised of a number of inter-connected IP multicast capable routers 260. The Multicast Backbone (MBone), which is capable of transmitting IP multicast sessions, is one example of such an IP multicast network. A sender 270 may send an IP multicast transmission through the IP multicast network 250 directly to one or more receivers 280.

According to an embodiment of the present invention, the enhancement platform 350 receives a number of IP multicast transmissions through the communication port 32 and enhances the stream at substantially the time each stream is received. The enhancement platform 350 may, for example, join the IP multicast network 250 using Internet Group Management Protocol (IGMP). The enhancement platform 350 may then, for example, transcribe the streams using a speech recognition engine, and/or translate the content using a translation engine, as required.

The enhancement platform 350 may also include one or more databases. For example, a database containing information about subscribers (not shown in FI(G. 3), may indicate which subscribers have requested which enhanced streams and how each subscriber would like to receive the enhanced streams. The information in such a database may be based on, for example, a form filled out by the user when he or she subscribes to an enhancement service. Moreover, the enhancement platform 350 may include an enhancement database 372, a closed caption database 382, a translation database 384, a sign language database 386 and a video database 388 which store information used by the enhancement platform 350 to enhance the multicast information streams.

The enhanced streams are sent through another communication port 354 to a user's PC 110. The enhanced stream may instead be sent directly to the user's PC 110, if desired. This may be done, for example by sending the enhanced stream in the form of a second Internet protocol multicast transmission stream to one or more user PCs 110. The enhanced stream may also be sent to the user's PC 110 at the conclusion of the information stream, if desired.

Figure 4:
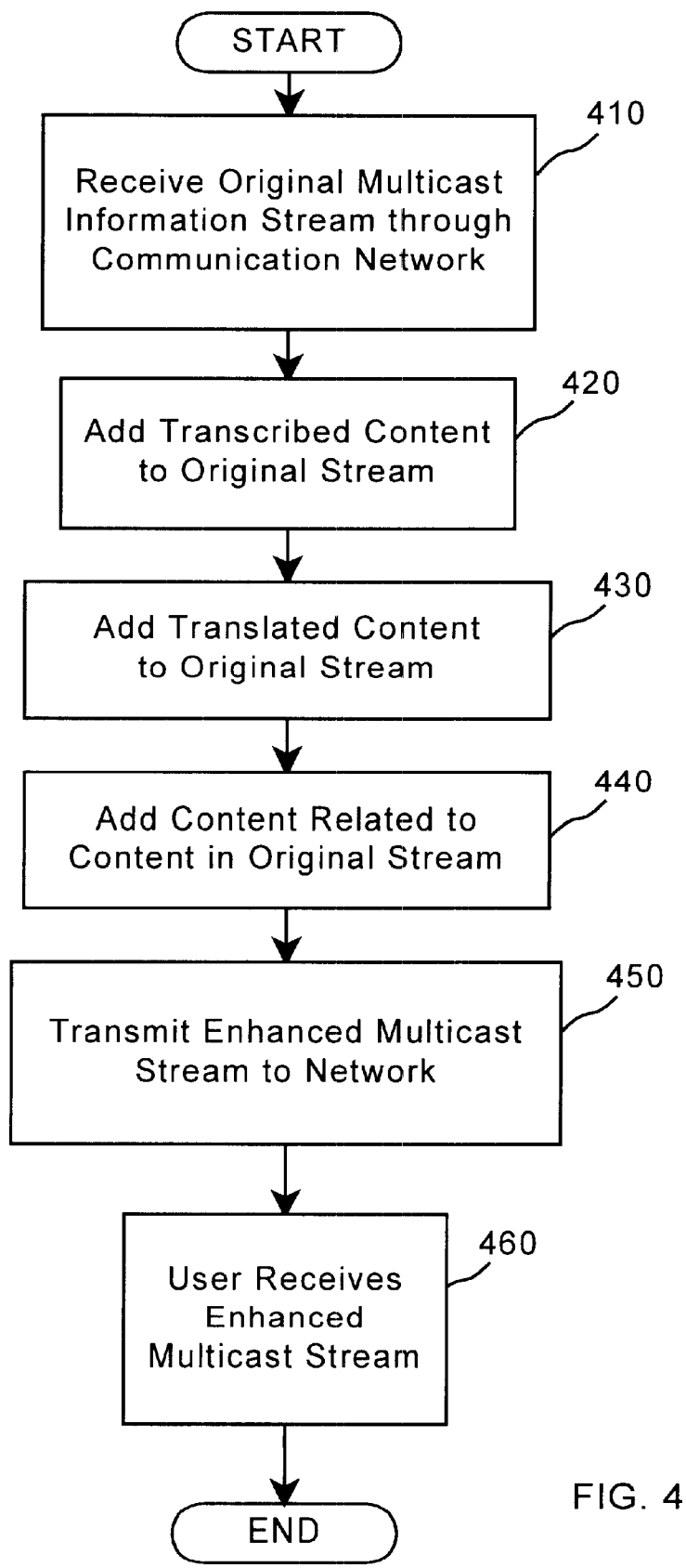
FIG. 4 is a block flow diagram of a method for enhancing a multicast information stream in a communication network according to an embodiment of the present invention.

FIG. 4 is a block flow diagram of a method for enhancing a multicast information stream in a communication network according to an embodiment of the present invention. The enhancement process executing the method may operate as follows. After beginning, an enhancement platform receives a multicast transmission through the communication network at step 410. The enhancement platform may do this, for example, by joining a first IP multicast transmission session on the communication network. In this case, the enhancement platform may receive the information stream as a first IP multicast transmission stream.

The first information stream is enhanced, at substantially the time the first stream is received. The first information stream may be enhanced by adding transcribed content to the first stream as indicated at step 420, such as content generated by speech recognition software. The first information stream may also be enhanced by adding translated content to the stream as indicated at step 430, such as content translated from a first language to a second language. The first information stream may also be enhanced by adding content related to content in the information stream as indicated at step 440.

At step 450, the enhanced stream is transmitted to the communication network as a second multicast information stream, such as a second IP multicast session to be received by the users in place of the original IP multicast session. At step 460 one or more users receive the enhanced multicast stream. If desired, the enhancement platform may concurrently receive, enhance, and send a number of multicast information streams.

Figure 5:
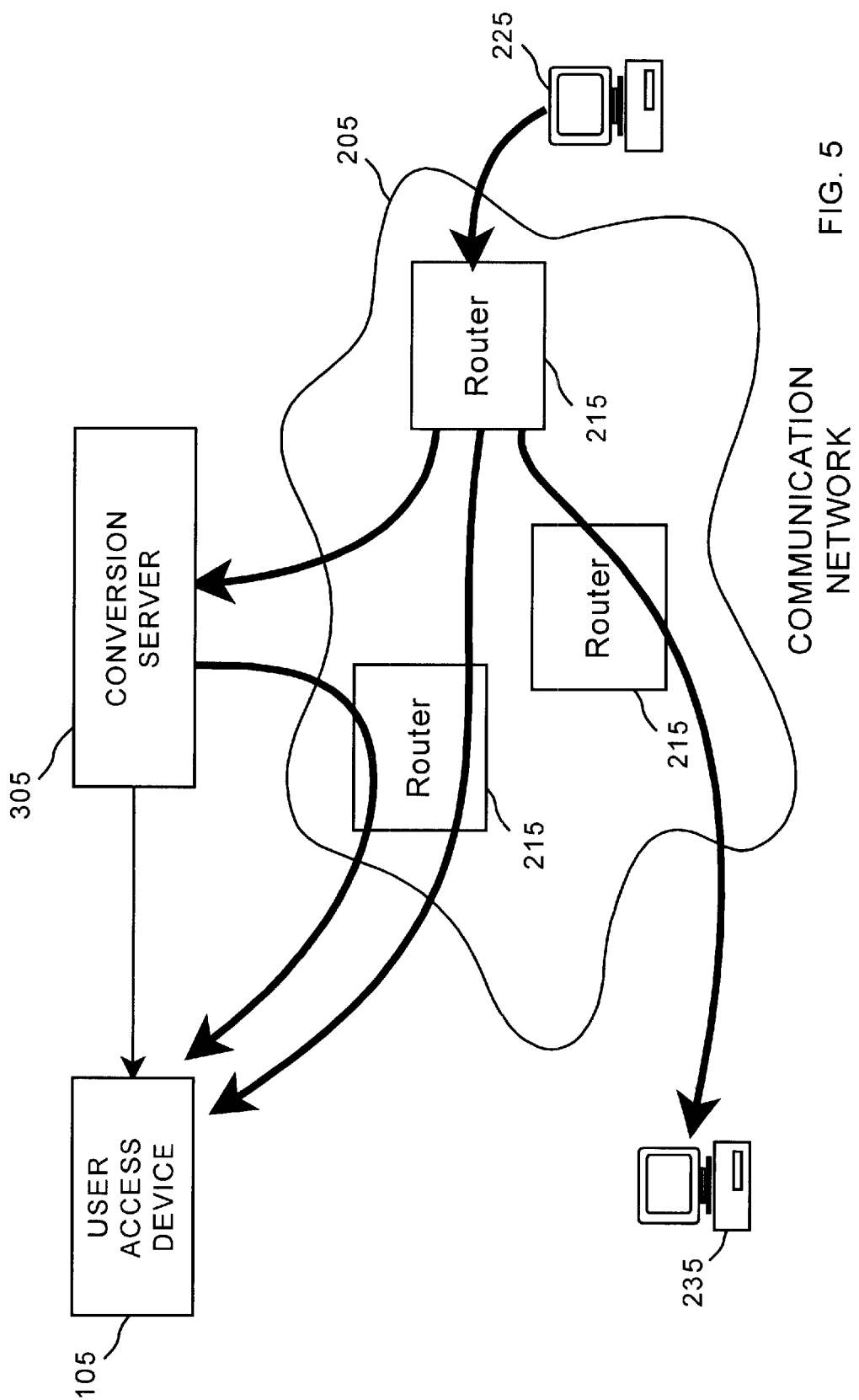
FIG. 5 is a block diagram including a system that converts an information stream in a communication network according to another embodiment of the present invention.

FIG. 5 is a block diagram including a system that converts an information stream in a communication network according to another embodiment of the present invention. The system includes a conversion server 305 coupled to a communication network 205, such as the Internet. The communication network 205 comprises of a number of inter-connected routers 215 that let a sender 225 transmit an information stream to a receiver 235.

According to this embodiment of the present invention, the conversion server 305 receives an information stream through the communication network 205 and converts content in the stream at substantially the time the stream is received. As used herein, "converted" information implies the information is separately sent to a user along with, instead of in place of, the original stream and includes, for example, content that has been transcribed from one form to another.

Note that an information stream may include a number of different types of content, such as text, audio and image content. According to an embodiment of the present invention, one or more of the types of content may be converted by the conversion server 305, such as by transcribing and/or translating the content.

The converted content is sent to a user access device 105, such as a user's Personal Computer (PC). This may be done, for example by sending the converted content to one or more user PCs, as the stream is converted, in the form of a transmission stream to be received by the user along with the original stream. In this way, a used could receive a translated version of a transmission at substantially the same time as the original version is received. The converted content may also be sent to the user access device 105 at the conclusion of the information stream, such as in the form of a text file, if desired.

Note that the conversion server 305 may service a large number of users, such as a large number of users who have subscribed to transcription and/or translation services. The conversion server 305 may also receive and convert a large number of information streams from the communication network 205. The conversion server 305 may perform this service independently and remotely from the users and from the parties supplying information streams. According to another embodiment of the present invention the conversion server 305 may instead be associated with a party supplying a number of information streams.

Figure 6:
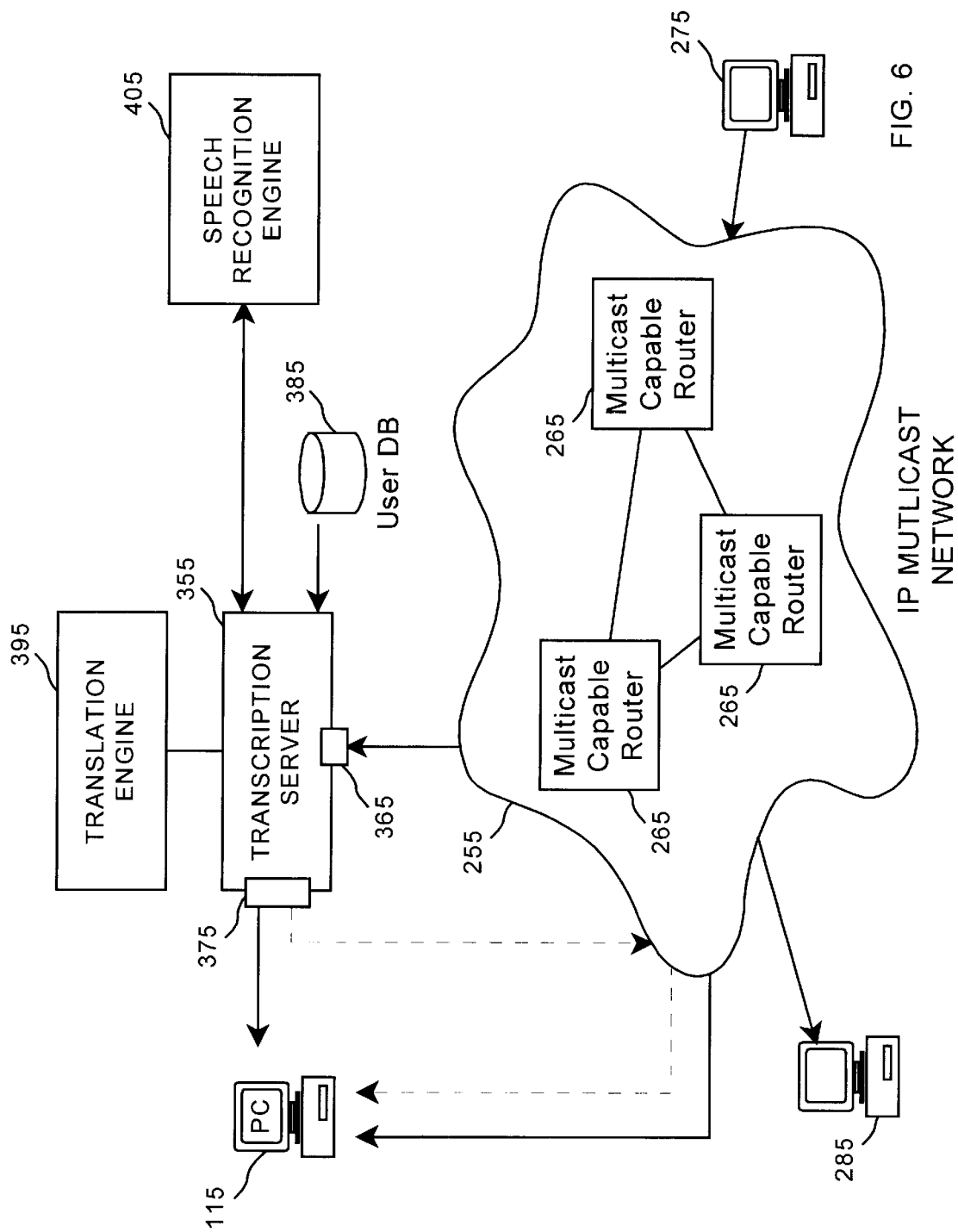
FIG. 6 is a more detailed block diagram of a system that converts an information stream according to another embodiment of the present invention.

FIG. 6 is a more detailed block diagram of a system that converts an information stream according to another embodiment of the present invention. The system includes a transcription server 355 connected to an Internet protocol (IP) multicast network 255 through a communication port 365 (e.g. an Ethernet port). The IP multicast network 55 is comprised of a number of inter-connected multicast capable routers 265. The Multicast Backbone (MBone), which is capable of transmitting IP multicast sessions, is one example of an IP multicast network. A sender 275 may send an IP multicast transmission through the IP multicast network 955 to one or more receivers 285.

According to this embodiment of the present invention, the transcription server 355 receives a number of IP multicast transmissions through the communication port 365 and converts content in the streams at substantially the time each stream is received. The transcription server 355 may, for example, join the IP multicast network 255 using Internet Group Management Protocol (IGMP). The transcription server 355 then transcribes the content using, a speech recognition engine 405, and translates the content using a translation engine 395, as required.

A user database 385, such as a database containing information about a number of subscribers, may contain information about (1) which subscribers have requested transcribed and/or translated content, (2) which IP multicast streams should be converted, and (3) how each subscriber would like to receive the converted content. The information in the user database 385 may be based on, for example, a form filled out by the user when he or she subscribes to a transcription or translation service.

The converted content is sent through another communication port 375 to a user's PC 115. The converted content may be sent directly to the user's PC 115, if desired. As shown by the dashed lines in FIG. 6, the converted content may also be sent to the user's PC 115 through the IP multicast network 255. This may be done, for example by sending the converted content in the form of a second IP multicast transmission stream. The transcribed content may also be sent to the user's PC 115 at the conclusion of the information stream, such as in the form of a text file sent by electronic mail, if desired.

Figure 7:
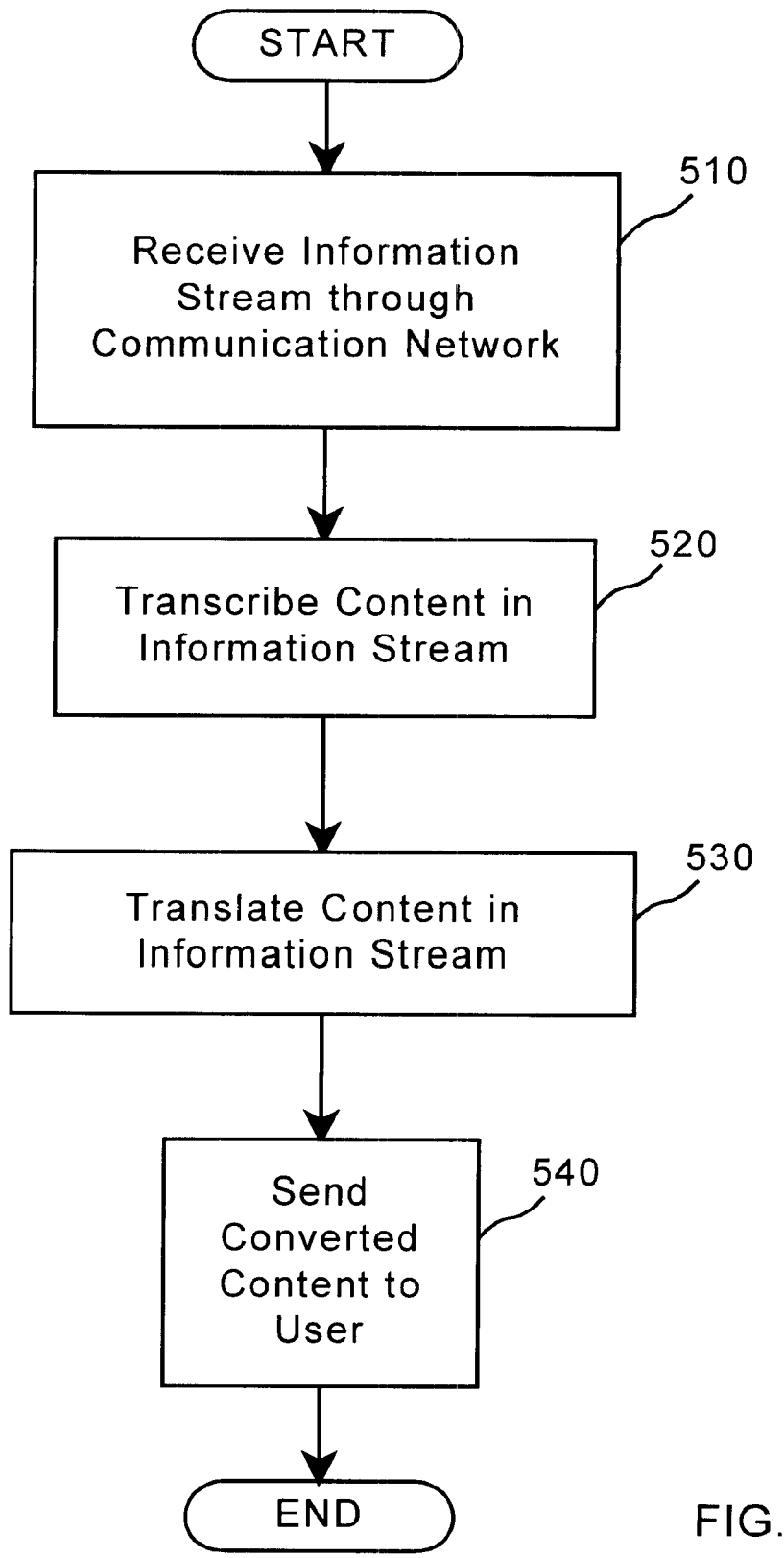
FIG. 7 is a block flow diagram of a method for converting an information stream in a communication network according to another embodiment of the present invention.

FIG. 7 is a block flow diagram of a method for converting an information stream in a communication network according to an embodiment of the present invention. The conversion process executing the method may operate as follows. After beginning, a conversion server receives the transmission through the communication network at step 510. The conversion server may do this, for example, by joining a first IP multicast transmission session on the communication network. In this case, the conversion server may receive the information stream as a first IP multicast transmission stream.

Content in the information stream may be transcribed as indicated at 520, at substantially the time the stream is received, such as with the use of speech recognition software. If desired, the content may be translated as indicated at 530, such as from a first language to a second language. At step 540, the converted content is sent to a user, such as by sending the converted content to one or more users, as it is converted, in the form of a second IP multicast transmission stream. The converted content may also be sent to the user at the end of the information stream or stored for later access, if desired.

Although various embodiments are specifically illustrated and described herein, it will be appreciated that modifications and variations of the present invention are covered by the above teachings and within the purview of the appended claims without departing from the spirit and intended scope of the invention. For example, although particular system architectures were used to illustrate the present invention, it can be appreciated that other architectures may be used instead. Similarly, although particular types of enhancements and conversions have been illustrated, other types of enhancements and conversions will also fall within the scope of the invention. Finally, although software or hardware are described to control certain functions, such functions can be performed using either software, hardware or a combination of software and hardware, as is well known in the art. As is also known, software may be stored on a medium, such as, for example, a hard or floppy disk or a Compact Disk Read Only Memory (CD-ROM). in the form of instructions adapted to be executed by a processor. The instructions may be stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

What is claimed is:

1. A method for enhancing a multicast information stream in a communication network accessible to a plurality of users each having a user profile, comprising the steps of:

receiving a multicast information stream through the communication network;

performing a first enhancement, in accordance with a first user profile, on the received information stream upon receipt of the stream, to generate a first enhanced stream;

performing a second enhancement, in accordance with a second user profile, on the received information stream upon receipt of the stream, to generate a second enhanced stream;

wherein one of said enhancements comprises the steps of:
transcribing content in the received information stream; and
adding the transcribed content to the received information stream; and sending the first and second enhanced streams, through the communication network, as multicast information streams.

2. The method of claim 1, wherein said step of transcribing comprises the step of: transcribing content in the received information stream using speech recognition software.

3. The method of claim 1, wherein said one of said enhancements further comprises the step of:
translating the content in the received information stream.

4. A method for enhancing a multicast information stream in a communication network accessible to a plurality of users each having a user profile, comprising the steps of:

receiving a multicast information stream through the communication network;

performing a first enhancement, in accordance with a first user profile, on the received information stream upon receipt of the stream, to generate a first enhanced stream;

performing a second enhancement, in accordance with a second user profile, on the received information stream upon receipt of the stream, to generate a second enhanced stream;

wherein one of said enhancements comprises the steps of:
translating content in the received information stream; and
adding the translated content to the received information stream; and sending the first and second enhanced streams, through the communication network, as multicast information streams.

5. A method for enhancing a multicast information stream in a communication network accessible to a plurality of users each having a user profile, comprising the steps of:

receiving a multicast information stream through the communication network, performing a first enhancement, in accordance with a first user profile, on the received information stream upon receipt of the stream, to generate a first enhanced stream;

performing a second enhancement, in accordance with a second user profile, on the received information stream upon receipt of the stream, to generate a second enhanced stream;

wherein one of said enhancements comprises the step of:

adding content related to content in the received information stream; and sending the first and second enhanced streams through the communication network as multicast information streams.

6. An apparatus for enhancing a multicast information stream in a communication network, comprising:

a first communication port configured to receive a multicast information stream through the communication network;

a second communication port configured to send a first enhanced multicast information stream through the communication network;

a third communication port configured to send a second enhanced multicast information stream through the communication network;

a database comprising a plurality of user profiles; and a processor system coupled to said first, second and third communication ports, and said database, said processor system being configured to enhance the received multicast information stream upon receipt of the multicast information stream in accordance with at least one of the plurality of user profiles, and to send enhanced multicast information streams through said second and third communication ports;

wherein said processor system is configured to enhance content in the received stream by transcribing the content in accordance with the at least one user profile and adding the transcribed content to the received stream.

7. An apparatus for enhancing a multicast information stream in a communication network, comprising:

a first communication port configured to receive a multicast information stream through the communication network;

a second communication port configured to send a first enhanced multicast information stream through the communication network;

a third communication port configured to send a second enhanced multicast information stream through the communication network;

a database comprising a plurality of user profiles; and a processor system coupled to said first, second and third communication ports, and said database, said processor system being configured to enhance the received multicast information stream upon receipt of the multicast information stream in accordance with at least one of the plurality of user profiles, and to send enhanced multicast information streams through said second and third communication ports;

wherein said processor is configured to enhance content in the received stream by translating the content in accordance with the at least one user profile and adding the translated content to the received stream.

8. A method for converting a multicast information stream in a communication network accessible to a first user having a first user profile and a second user having a second user profile, comprising the steps of:

receiving the multicast information stream through the communication network;

converting content in the multicast information stream, in accordance with the first user profile, upon receipt of the multicast information stream, to generate first converted content;

converting content in the multicast information stream, in accordance with the second user profile, upon receipt of the multicast information stream, to generate second converted content, the second converted content being, different from the first converted content;

wherein one of said steps of converting comprises the step of:

translating content in the multicast information stream; and sending the first converted content to the first user and the second converted content to the second user.

9. A method for converting a multicast information stream in a communication network accessible to a first user having a first user profile and a second user having a second user profile, comprising the steps of:

receiving the multicast information stream through the communication network;

converting content in the multicast information stream, in accordance with the first user profile, upon receipt of the multicast information stream, to generate first converted content;

converting content in the multicast information stream, in accordance with the second user profile, upon receipt of the multicast information stream, to generate second converted content, the second converted content being different from the first converted content;

wherein one of said steps of converting comprises the step of:

transcribing content in the multicast information stream; and sending the first converted content to the first user and the second converted content to the second user.

10. The method of claim 9, wherein said step of transcribing comprises the step of:

transcribing content in the multicast information stream using speech recognition software.

11. The method of claim 9, wherein said step of converting further comprises the step of:

translating the content in the multicast information stream.

* * * * *